ptinstaggeredUnited States Patent [19]
Blaurock et al.

[15] 3,700,271
[45] Oct. 24, 1972

[54] SPACER RING
[72] Inventors: Gunter Blaurock; Hans Stender, both of Schweinfurt; Werner Will, Geldersheim, all of Germany
[73] Assignee: Deutsche Star Kugelhalter GmbH, Schweinfurt am Main, Germany
[22] Filed: April 8, 1971
[21] Appl. No.: 132,503

[30] Foreign Application Priority Data
April 16, 1970  Germany.........P 20 18 367.9

[52] U.S. Cl............................................287/52.04
[51] Int. Cl...............................................F16d 1/06
[58] Field of Search..........287/52 R, 52.04; 308/236

[56] References Cited

UNITED STATES PATENTS 2,886,354  5/1959  Bjorklund...............287/52 R
2,931,412  4/1960  Wing.......................287/52 R
3,145,547  8/1964  Lyons......................308/236

FOREIGN PATENTS OR APPLICATIONS 1,337,146  7/1963  France....................287/52.04
253,122    7/1964  Australia................287/52.04

Primary Examiner—Andrew V. Kundrat
Attorney—Kelman & Berman

[57]  ABSTRACT

A tubular spacer ring for frictionally fastening a shaft in the oversized bore of a machine element is bent from a strip of embossed sheet metal having several circumferential rows of axially elongated projections on one face and corresponding recesses in the other face. The projections have a preferred axial length of 5–8 times their radial height, and must have a length of 3–10 times the height. The projections are identical and uniformly distributed in each row, but the rows are circumferentially offset by a fraction of the center-to-center spacing of the projections in each row.

10 Claims, 8 Drawing Figures

Patented Oct. 24, 1972

INVENTORS:
Günter Blaurock
Hans Stender
Werner Will

BY: Kelman and Berman,
agents

Patented Oct. 24, 1972

INVENTORS:
Günter Blaurock
Hans Stender
Werner Will

BY: Kelman and Berman,

AGENTS

SPACER RING

This invention relates to a driving connection between a shaft and a machine element receiving the shaft in an oversized bore, and particularly to a spacer ring of approximately cylindrical shape.

It is known to emboss sheet metal with projections on one face and corresponding recesses in the other face, to bend the sheet metal into the shape of a split cylinder, and to use the ring so formed as a spacer between a shaft and the walls of an oversized bore in a machine element that is desired to fasten on the shaft.

It has now been found that the shape, arrangement, and certain dimensional characteristics of the projections and recesses have a substantial effect on the magnitude of the torque that can be transmitted by a spacer ring of the type generally described above per unit of axial length.

Axially elongated projections have been found to be most effective if arranged in circumferential rows, and if their axial length is not less than three times, and not more than 10 times their radial height. For best results, the length should be between five and eight times the length.

The effectiveness of the projections in coupling the shaft to the other machine element has been found to be determined practically entirely by engagement of the three-dimensionally shaped, longitudinally terminal portions of each projection with a cooperating surface. The central portion of the projection is too soft when the length of the projection exceeds ten times its height to contribute as much to the holding force of the ring as it decreases the stiffness, and therefore the effectiveness of the end portions. The greatest holding force for a given axial length is achieved with a length not greater than eight times the height of the projection.

Conversely, a very short projection is so stiff that it does not adequately conform to the cooperating surface, the area of frictional contact is reduced, and the highest available torque transmission is not achieved. This holds particularly for projections whose length is less than three times the height, and optimum results cannot be achieved with projections less than five times as long as they are high.

The rows of projections and recesses must be axially separated by sections of the ring bounded by radial planes and free from projections to prevent distortion of the embossed sections, and the available axial length of the ring is utilized most effectively if the cylindrical ring sections between the rows of projections have an axial width which is twice the axial width of each axially terminal section free from projections and recesses.

The projections are preferably identical and uniformly spaced center-to-center and from each other in the several rows over the entire circumference of the ring. The several rows should be offset circumferentially relative to each other by a fraction of the center-to-center spacing of the projections within the row. The offset is conveniently chosen to be equal to the center-to-center spacing divided by the total number of rows. In such an arrangement, the axial slot or gap inherently present in the ring due to the aforedescribed method of manufacture cannot be located entirely between circumferentially adjacent projections, and thus cannot readily be expanded under the applied stresses and cause eccentricity of the shaft and the other machine element.

Other features and many of the attendant advantages of this invention will readily become apparent from the following detailed description of preferred embodiments when considered in connection with the appended drawing in which.

Figure 1:
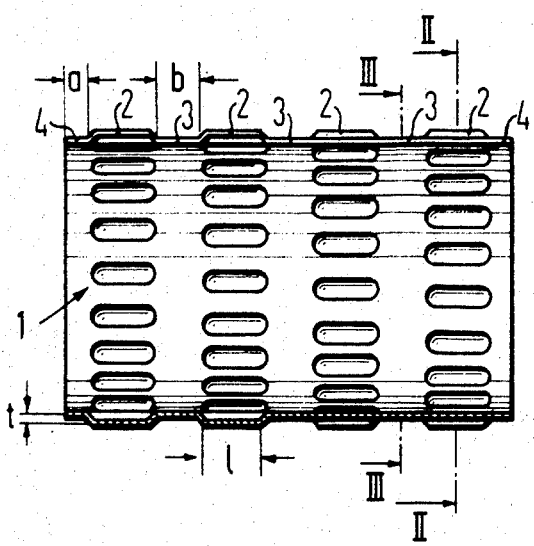
FIG. 1 shows a spacer ring of the invention in axial section on the line I — I in FIG. 2.

Referring now to the drawing in detail, and initially to FIGS. 1 to 4, there is seen a tubular, split spacer ring 1 whose outer face carries four circumferential rows of axially elongated, approximately trough-shaped projections 2 separated by three smoothly cylindrical ring sections 3. The axially terminal, annular sections 4 of the ring 1 are also free from projections and cylindrical. The projections 2 having been formed by embossing an initially flat piece of uniformly thick sheet metal, the inner face of the ring 1 is provided with a corresponding recess wherever a projection 2 is located on the outer face.

All projections 2 are identical in their shape, their axial length $l$ and their radial height $t$, the length being approximately seven times the height, and their center-to-center spacing $c$ is uniform in each row and the same in all rows. Except for a narrow, axial gap 5, the ring 1 extends about its axis in a full circle, and the projections 2 in each row are uniformly spaced from each other and aligned about the circumference of the ring.

Figure 4:
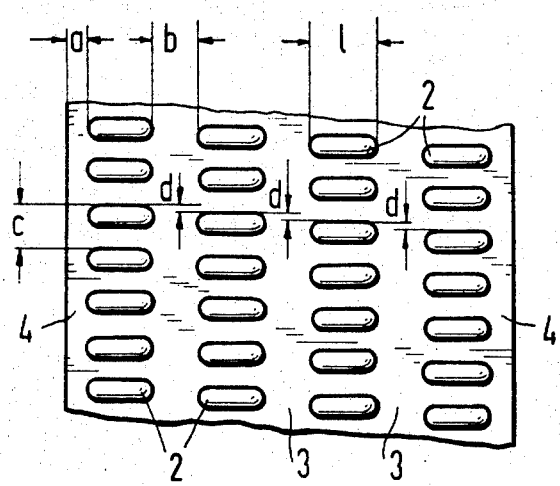
FIG. 4 is a fragmentary developed view of the ring of FIGS. 1 to 3.

As is best seen in the developed view of FIG. 4, the projections 2 in the several rows are not axially aligned, but the projections in each row are circumferentially offset from the projections 2 in the adjacent rows, the offset $d$ being approximately equal to the center-to-center spacing $c$ divided by the number of rows, or one quarter of the center-to-center spacing.

Because of this offset, the gap 5 cannot pass between two projections 2 in every row, but intersects at least one, and normally two or more projections. The axial edges of the sheet metal piece which bound the gap 5 are stiffened by the intersected projections, and the ring 1 is not readily deformed to produce eccentricity between two connected machine elements, as might occur when the gap is widened.

The smoothly cylindrical ring sections 3, 4 bounded by radial planes are important in achieving strongest frictional engagement of the ring with associated surfaces over a given axial length. The axial width $b$ of the sections 3 between the projections 2 is preferably somewhat smaller than the axial length $l$ of the latter, and the available axial dimension of the ring is utilized to best advantage if the width $b$ is about twice the axial width $a$ of the axial terminal cylindrical ring sections 4.

The circumferential width of each projection 2 has been found to be relatively unimportant, but the projections should be separated by a strip of sheet metal located in the cylinder defined by the sections 3,4. The thickness of the sheet metal also has been found not to have a basic effect on the results achieved by selecting the ratio of projection length and height and the distribution of the projections according to this invention. These criteria are important regardless of the nature of the metal employed, and apply to ferrous as well as non-ferrous metals, to the relatively hard steel of the illustrated ring 1 and to relatively soft brass or even aluminum.

Figure 5:
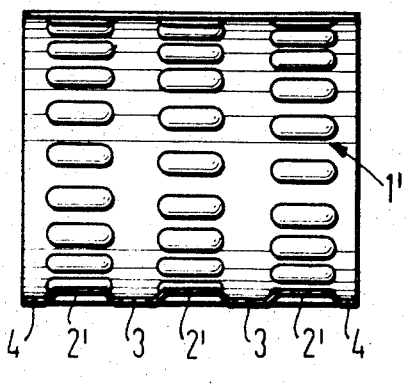
FIG. 5 shows another spacer ring of the invention in a view corresponding to that of FIG. 1.

The positions of the projections and recesses may be interchanged, if desired, and FIG. 5 shows a spacer ring 1' of the invention in which the projections 2' are directed toward the ring axis, and the corresponding recesses are formed in the radially outer face of the ring. The ring 1' has only three rows of projections 2' practically identical with the afore-described projections 2, and arranged in a corresponding manner. They are separated by cylindrical ring sections 3 about twice as wide in an axial direction as the ring sections 4 which are axially terminal.

Figure 6:
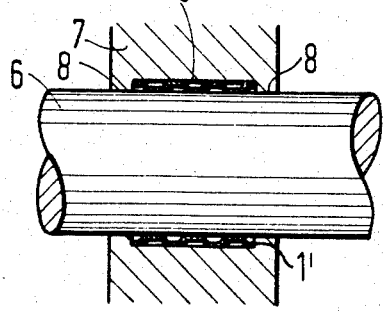
FIGS. 6 and 7 show a shaft coupled to respective other machine elements by the spacer ring of FIG. 5 in corresponding views.
Figure 7:
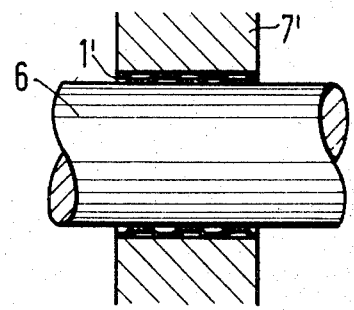

The manner of installing the spacer rings of the invention is illustrated in FIGS. 6 and 7 with reference to the ring 1'. FIG. 6 shows a shaft 6 which drives a machine element such as a radial cam 7, shown in FIG. 6 only to the extent relevant to this invention. The bore of the cam 7 which receives the shaft 6 has annular shoulders 8 at its two axial ends. The shoulders 8 axially bound a shallow annular groove 9 open toward the bore in which a spacer ring of the invention is received in such a position that the several cylindrical sections make area contact with the bottom of the groove 9 while the projections engage the surface of the shaft 6, the dimensions of the several elements being chosen in such a manner that the ring 1' is under radial compressive stress in the groove 9, and the shaft is movably centered in the shoulders 8.

In the arrangement seen in FIG. 7, an otherwise unchanged cam 7' has a bore of uniform cross section greater than that of the shaft 6 which is received in the bore. The clearance between the shaft and the bore is occupied by the compressed ring 1' which is axially coextensive with the bore.

The shoulders 8 prevent overloading of the spacer ring in the groove 9. Where such protections and a centering effect are not needed, the arrangement illustrated in FIG. 7 is capable of transmitting more torque than would be available from known similar spacer rings of equal axial length.

Figure 2:
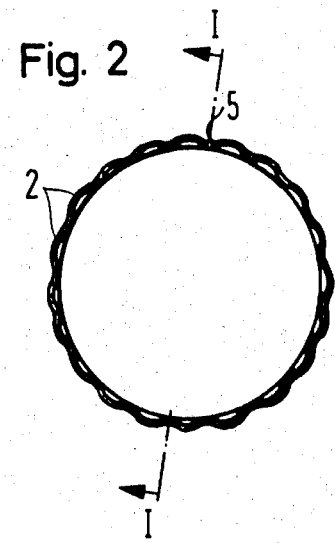
FIGS. 2 and 3 show the ring of FIG. 1 in radial section on the lines II—II and III—III respectively.
Figure 3:
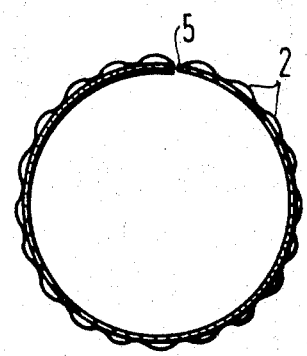
Figure 8:
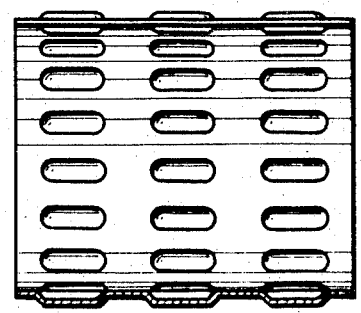
FIG. 8 shows yet another spacer ring of the invention in axial section.

FIG. 8 shows an embodiment similar to that of FIGS. 1 – 3 with the only difference that the embossed sections of the individual rows of embossed sections are axially aligned. This is the preferred embodiment of the invention.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a spacer ring of sheet metal having substantially uniform thickness, the ring having approximately cylindrical inner and outer faces, the improvement which comprises:
   a. said ring having respective pluralities of axially alternating first and second sections bounded by radial planes,
   b. each first section being formed with a row of integral projections in one of said faces and a corresponding row of recesses in the other face,
   c. said projections and recesses being axially elongated and circumferentially aligned in each row in spaced relationship,
   d. the axial length of each projection being three to 10 times the radial height of said projection,
   e. said second sections being substantially cylindrical and free from said projections and recesses and respective second sections being axially interposed between said first sections.

2. In a ring as set forth in claim 1, said axial length being between five to eight times said height.

3. In a ring as set forth in claim 2, the two axially terminal portions of said ring being constituted by respective second sections, the axial width of each second section axially interposed between two first sections being approximately twice the axial width of each of said axially terminal second sections.

4. In a ring as set forth in claim 2, said projections being substantially uniformly distributed in each row over the circumference of said ring.

5. In a ring as set forth in claim 4, said projections in said rows being substantially identical and uniformly spaced, the axial width of each second section being smaller than said axial length.

6. In a ring as set forth in claim 5, the projections in each row being axially aligned.

7. In a ring as set forth in claim 4, the projections in each row being circumferentially offset from the projections in each axially adjacent row, the offset being smaller than said spacing.

8. In a ring as set forth in claim 7, said offset being approximately equal to said spacing divided by the number of said rows.

9. In a ring as set forth in claim 7, said offset being approximately one quarter of said spacing.

10. In a ring as set forth in claim 1, said second sections being free from all projections and recesses.

* * * * *